United States Patent [19]

Jaycox

[11] Patent Number: 5,055,636
[45] Date of Patent: Oct. 8, 1991

[54] SEALED REENTERABLE SPLICE ENCLOSURE

[75] Inventor: Donald F. Jaycox, Riverwoods, Ill.

[73] Assignee: Reliance Comm/Tec Corporation, Chicago, Ill.

[21] Appl. No.: 531,879

[22] Filed: May 31, 1990

[51] Int. Cl.⁵ .................. H02G 15/06; H01R 43/00
[52] U.S. Cl. ................................... 174/87; 156/49; 174/38; 174/77 R; 174/93
[58] Field of Search .............. 174/87, 37, 38, 77 R, 174/93; 156/49

[56] References Cited

U.S. PATENT DOCUMENTS

| | | | |
|---|---|---|---|
| 1,780,686 | 11/1930 | Proos | 174/77 R X |
| 2,688,651 | 9/1954 | Blake | 174/93 |
| 2,938,940 | 5/1960 | Calendine et al. | 174/77 R |
| 3,569,608 | 3/1971 | Ance | 174/93 |
| 3,710,003 | 1/1973 | Channell | 174/37 |
| 3,728,467 | 4/1973 | Klayum et al. | 174/38 |
| 3,769,443 | 10/1973 | Pierzchala et al. | 174/38 |
| 3,848,074 | 11/1974 | Channell | 174/38 |
| 3,919,460 | 11/1975 | Neail et al. | 174/87 |
| 4,267,401 | 5/1981 | Wilkinson | 174/77 R |
| 4,369,284 | 1/1983 | Chen | 524/476 |
| 4,488,013 | 12/1984 | Ziegler | 179/175.1 R |
| 4,600,261 | 7/1986 | Debbaut | 174/76 X |
| 4,622,436 | 11/1986 | Kinnan | 174/77 R |
| 4,631,353 | 12/1986 | Marks | 174/16 R |
| 4,634,207 | 1/1987 | Debbaut | 174/76 X |
| 4,902,855 | 2/1990 | Smith | 174/77 R |

OTHER PUBLICATIONS

3M Instruction Bulletin, "PST Pedestal Splice Closure", Jul. 1987, pp. 1-7.

Primary Examiner—Morris H. Nimmo
Attorney, Agent, or Firm—Trexler, Bushnell, Giangiorgi & Blackstone

[57] ABSTRACT

A method and apparatus for sealing a splice enclosure to protect cable splice connections retained therein. The sealing member is a single piece body integrally formed of a suitable material which resists detrimental environmental effects and is resiliently compressible in an axial direction to seal the splice enclosure. Axial compression of the sealing member is employed to create sealing forces both about the outer periphery of the sealing member and between the sealing member and cables projecting therethrough. Reentry into the enclosure does not require destruction of the sealing member and does not require tapes, adhesives or other materials and is hence very time, labor and material efficient.

20 Claims, 3 Drawing Sheets

SEALED REENTERABLE SPLICE ENCLOSURE

BACKGROUND OF THE INVENTION

This invention relates to the splice enclosure arts and more specifically to an apparatus and method for sealing splice enclosures.

Dependency upon telecommunications and data communications presses the technology to provide consistent high quality communications with minimal down time. A key to providing high quality communications with minimal down time is to protect installations at critical points and provide for quick and efficient in-field repairs.

In the communications field it is common to install multi-carrier primary cables to provide communication service to a predetermined area. The primary cable, consists of perhaps approximately 100 individual binder groups of multiple wire pairs.

At specific points along the primary cable, connections must be made to route individual wire pairs to end user locations. Primary cables are typically very long continuous cables and are not conveniently manufacturable with specific service cable lengths at predetermined break off points. In this situation, it becomes necessary to extract specific binder groups from the primary cables and to splice these wire pairs to service cables which are then routed to the end user locations.

The splice connection between the service cable and the primary cable wire pairs must be protected from the environment in which it is installed, since moisture, oxygen, temperature, and the accumulation of dust and dirt or chemicals may individually or cumulatively act to the detriment of the splice connections. Typically, prior art splice encloses protects a portion of primary cable and the splice connections in a so-called dome enclosure. The dome enclosure is an elongate sleeve-like structure having a closed end and an open end through which the primary cable and service cables are inserted and from which these cables project. To protect the primary cable and the splice connections from detrimental environmental effects, the open end of the dome enclosure must be sealed.

Current dome enclosure sealing technology has problems which must be overcome to improve telecommunications quality and minimize down time for repairs. For example, a typical prior art sealing arrangement which seals the opening formed in the dome enclosure must be individually fabricated for each installation which is to be sealed. The sealing arrangement is fabricated by repeatedly wrapping tape-like material around the cables projecting through the opening and then inserting the wrapped cables in the opening. The dome enclosure then employs some form of circumferential constricting apparatus to circumferentially compress the wrapped cables to enhance the seal.

This type of prior art sealing arrangement is complex and time consuming to assemble and unnecessarily lengthens down time for installations and repairs. The problem is exacerbated when a repair or modification is needed to the splice connections since under the circumstances the sealing arrangement must be severed and removed and a new sealing arrangement re-constructed. This type of prior art sealing arrangement and method unnecessarily wastes time and valuable resources.

A specific example of a prior art enclosure and sealing arrangement is the PST pedestal splice closure manufactured by 3M, TeleComm Products Division, Austin, Tex. This arrangement is also shown in U.S. Pat. No. 4,902,855 to Smith. In this prior art splice enclosure, the cables are inserted into a dome enclosure and the open end is sealed. A sealing arrangement is formed through the tape wrapping method described above. This method forms a seal which is inherently non-uniform thereby creating potential for problems with the fit inside of the dome member and/or any circumferential compression fitting or clamp used to engage and seal the structure. Further, depending upon the type of tape used, the ground wires may have to be separately wrapped prior to incorporation into the common seal. The sealing arrangement as formed is then inserted into the open end of the dome enclosure and a shrink tubing is positioned and shrunk around the outside of the dome to retain the sealing member therein. Alternately, a clamp may be used, as shown in the above-mentioned '855 patent.

As mentioned above, this type of prior art sealing system is inherently extremely time consuming and material intensive. Further, this system risks cutting or otherwise damaging cable jackets in attempting to remove the shrink tubing as well as the sealing member when repairing or modifying splice connections. Additionally, sufficient supplies such as tapes and shrink tubing must always be on hand or further delays due to lack of supplies may result when installing or repairing splice connections.

OBJECTS AND SUMMARY OF THE INVENTION

It is an object of the present invention to provide a reusable and easily reenterable splice enclosure for protecting splice connections made to a primary cable Another object of the present invention is to provide a sealing apparatus and sealing method which facilitates ease of access to the splice connections for providing efficient access and resealing of the splice enclosure.

A more specific object of the present invention is to provide a splice enclosure sealing member which is axially compressed to create sealing forces between an opening in a dome enclosure and cables projecting therethrough.

Briefly, and in accordance with the foregoing, the present invention comprises a method and apparatus for sealing a splice enclosure to protect cable splice connections retained therein. The sealing member is a single piece body integrally formed of a suitable material which resists detrimental environmental effects and is resiliently compressible in an axial direction to seal the splice enclosure. Axial compression of the sealing member is employed to create sealing forces both about an outer periphery of the sealing member and between the sealing member and cables projecting therethrough Reentry into the enclosure does not require destruction of the sealing member and does not require tapes, adhesives or other materials and is hence very time, labor and material efficient.

BRIEF DESCRIPTION OF THE DRAWINGS

The organization and manner of the operation of the invention, together with further objects and advantages thereof may be understood best by reference to the following description taken in connection with the accompanying drawings wherein like reference numerals identify like elements and in which.

DETAILED DESCRIPTION OF THE ILLUSTRATED EMBODIMENT

While this invention may be susceptible to embodiment in different forms, there is shown in the drawings and will be described herein in detail a specific embodiment of the present invention with the understanding that the present disclosure is to be considered an exemplification of the principals of the invention, and not intended to limit the invention to the embodiment illustrated and described herein.

It should be noted that dimensional relationships between members of the illustrated embodiment may vary in practice or may have been varied in the illustrations to emphasize certain features of the invention.

Figures 1, 2:
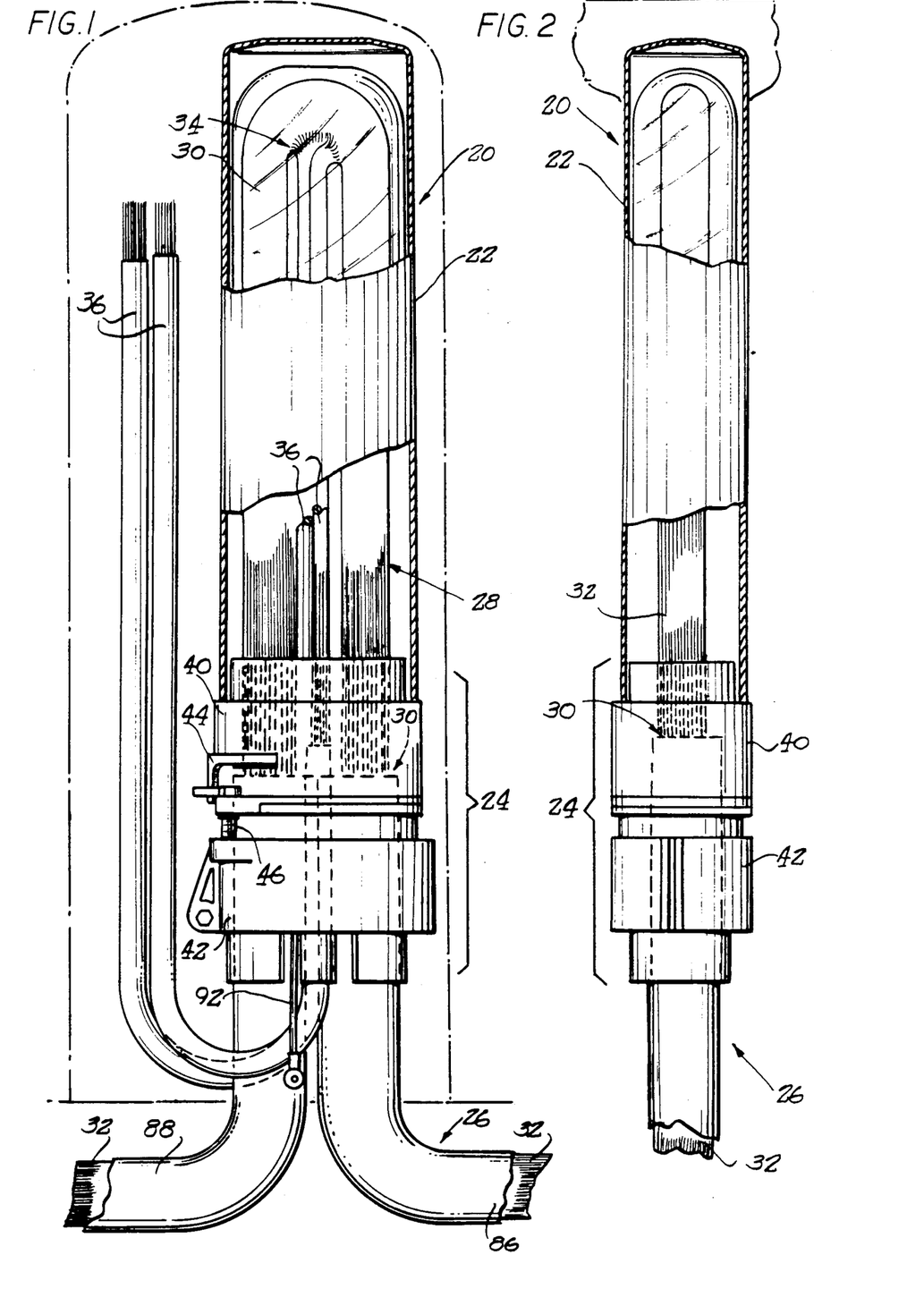
FIG. 1 is a partially broken away side view of a splice enclosure which is reenterably sealed in accordance wit the invention.
FIG. 2 is a side view of the splice enclosure rotated approximately 90° from the view illustrated in FIG. 1.

As shown in FIGS. 1 and 2, a splice enclosure 20 is illustrated comprising a dome member 22 and sealing means 24. As illustrated in FIG. 1, a primary cable 26 has a looped portion 28 extending into the splice enclosure 20 through the sealing means 24. The primary cable may be any type of cable including, but not limited to; copper telecommunications cable, fiber optic cable as well as power cables. A portion of a cable jacket 30 is removed from the looped portion 28 to expose multiple binder groups 32 which comprise the primary cable 26. Splice connections 34 are made to selected wire pairs of a binder group 32 so that selected individual service cables 36 may be routed to user locations.

The splice enclosure 20 seals the splice connections 34 inside of the dome member 22 by sealing an open end 38 of the dome member with the sealing means 24. The sealing means 24 comprise an upper seal neck member or portion 40 and a lower split shell member or portion 42. As will be described in greater detail hereinbelow, the dome member 22 sealably attaches to the upper seal neck portion 40 by means of a spline 44 and the upper seal neck member 40 is longitudinally engaged with the lower split shell member 42 by means of fastener 46.

Viewed from the side, the splice enclosure 20 accommodates the looped portion 28 of the primary cable 26. As shown in greater detail in FIG. 3, the dome member 22, upper seal neck member 40 and lower split shell member 42 may be cross-sectionally oval shaped or circular members in various sized embodiments.

Figures 3, 4, 5:
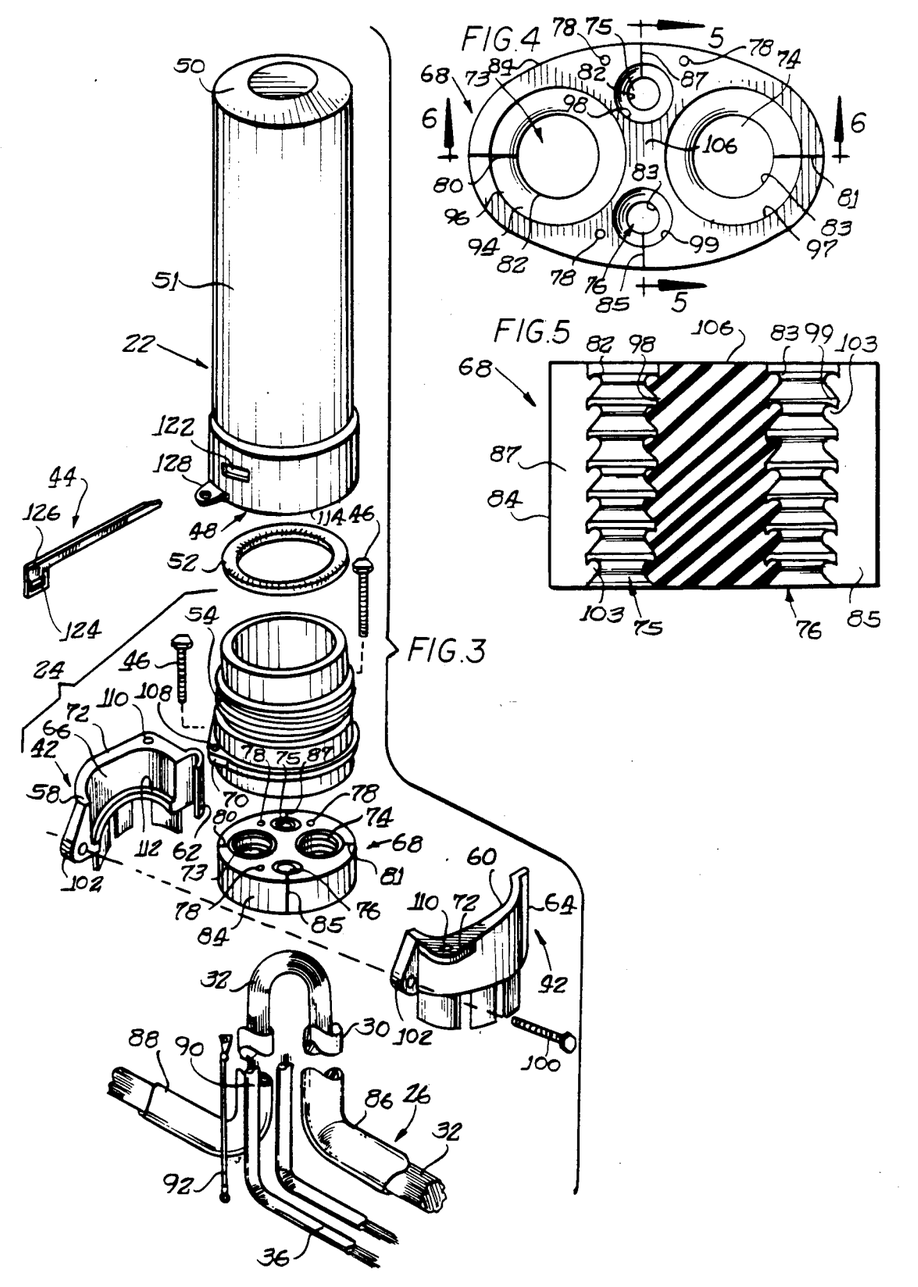
FIG. 3 is an exploded perspective view of the splice enclosure of FIGS. 1 and 2.
FIG. 4 is a plan view of a sealing member.
FIG. 5 is a cross-sectional view of the sealing member taken along the line 5—5 in FIG. 4.

FIG. 3 provides an exploded perspective view of the splice enclosure providing further detail thereof. The dome member 22 is a generally tubular member (shown with a cross-sectionally circular shape in FIG. 3 and a cross-sectionally oval shape in FIGS. 4-6) having an end opening 48 formed in one end, and a closed top end 50 which is integrally formed with the tubular side wall portion 51 of the dome member 22. The dome member 22 fits over the upper seal neck member 40. An enclosure sealing O-ring 52 is positioned in an O-ring groove 54 formed on the outside of the upper seal neck member 40. The O-ring 52 compressibly seals against an inside surface of the dome member 22 to form a seal between the upper seal neck member 40 and the dome member 22. An annular groove 56 is formed below the O-ring groove 54, in both the dome 52, and the seal neck 40 cooperatively positioned to permit engagement by the lock spline 44 inserted thereinto through the aperture 122 in the dome side wall.

The lower split shell member 42 is formed with a first half or portion 58 and a second half or portion 60. The first portion 58 is formed with a hinge portion 62 which hingedly engages a hinge pin 64 formed in the second portion 60. The first and second portions 58, 60 form an oval or circular inner surface or receptacle 66 when joined. A sealing grommet member 68 is retained in the receptacle 66 and is longitudinally or axially compressed therein between the lower split shell member 42 and the upper seal neck member 40. Longitudinal or axial compression of the sealing member 68 between the lower split shell member 42 and the upper seal neck member 40 is accomplished by threaded fasteners 46 which engage seal neck flanges 70 and shell flanges 72. The longitudinal or axial direction of compression as used herein is to be understood as being with reference to the longitudinal axes of the cable portions as they pass through the sealing member 68.

As shown in greater detail in FIGS. 4 and 5, the sealing member 68 is formed with two primary cable apertures 73, 74, two service cable apertures 75, 76 and one or more ground cable apertures 78. The primary cable and service cable apertures 73, 74, 75 and 76 are formed with radial slits 80, 81, 85 and 87 which extend from an edge 82 of each of the cable apertures 73, 74, 75 and 76 outwardly towards an outside surface or outer periphery 84 of the sealing member 68. The radial slits allow the cable apertures 73, 74, 75 and 76 to be opened to receive an entering portion 86 and an exiting portion 88 of the looped portion 28 of the primary cable 26 and the lengths of service cables 36. The ground cables 92 are axially inserted through the ground cable apertures 78 for appropriate attachment to the primary cable 26 and service cables 36. Alternatively, the service cable apertures may not have radial slits, for those new installations where the service cable ends are not already spliced to the primary cable and can therefore be inserted through an unslit hole.

The sealing member 68, as shown in FIGS. 3-6 is a single piece unitary body integrally formed of a resiliently compressible material. Preferably, the sealing member 68 is formed of a polyether or polyester based polyurethane with a Shore A hardness of 3 to 40, but preferably on the order of A7 to A20. The sealing member 68 is composed of a material chosen to provide sealing of the splice enclosure 20 over a range of environmental stress factors including exposure to moisture, temperature, and pressure extremes, and certain chemicals. The material employed for this purpose should provide optimum hydrolytic stability, low water absorption, resistance to dry heat aging, have a low compression set, and also be resistant to airborne pollution chemicals (including, but not limited to: oils, water displacing lubricants, service wire and cable filling compounds and splice encapsulants, insecticides, herbicides and hydrogen sulfide and corrosion cleansing solutions) and those commonly found in surface soil water tables (including, but not limited to: unleaded high octane gasoline, sodium hydroxide, trichloroethane and sulfuric acid) as well as resistance to airborne and soil salts and salt water. Ideally the material should not vary appreciably from its initial properties when subjected to such stress factors in field applications.

For example, a preferred set of criteria for sufficient sealing includes a minimum tensile strength of the material of at least substantially on the order of 70 psi; a minimum elongation of at least substantially on the order of 300%; minimum tear resistance of at least substantially on the order of 10 lbf/in; and compression set of less than substantially on the order of 8% after 8 days at 70° F. under 25% compression. Specific examples of materials satisfying these criteria are designated as DEXTHANE 200 which is a product available from Dexter/Hysol Corporation of Seabrook, N.H. and as BIWAX No. 82,879, a product available from BIWAX Corporation, Des Plaines, Ill. This choice of material for the sealing member 68 assures that it will maintain an acceptable seal both about its outer periphery 84, which abuts the internal surfaces 66 of the seal neck 40 and split shell 42 and about the external peripheries of the entering and exiting cable portions 86, 88 of the primary cable 26 and the service cables 36 and ground cables 92 when subjected to field use conditions.

Figure 6:
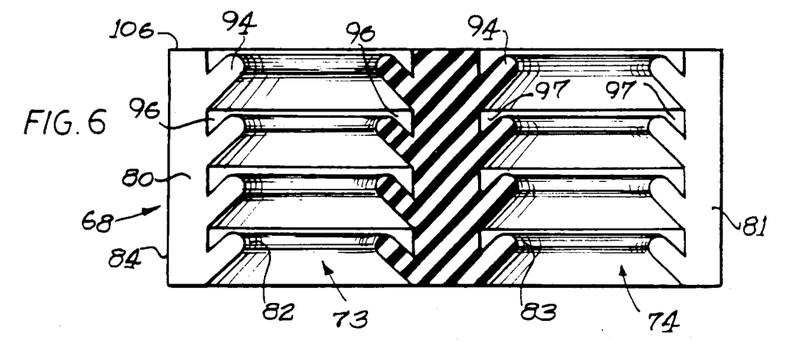
FIG. 6 is an enlarged cross-sectional view of the sealing member taken along the line 6—6 in FIG. 4.
Figure 7:
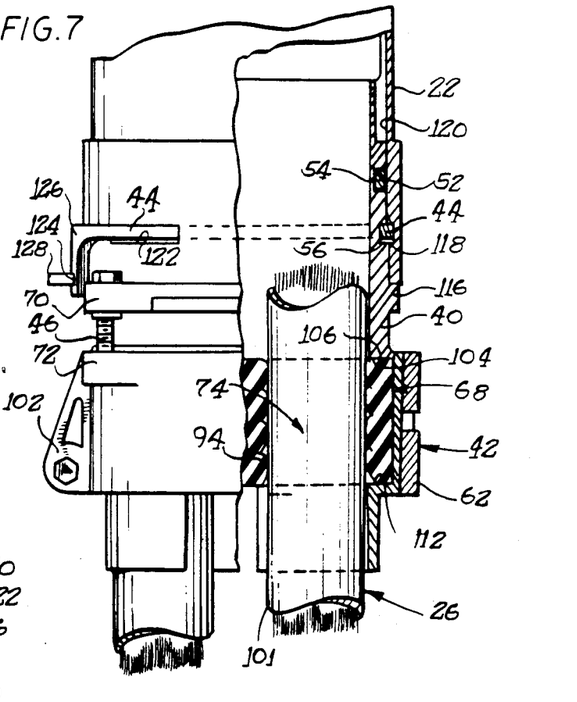
FIG. 7 is a partially broken away side view of longitudinal compression means used for longitudinally compressing the sealing member of FIGS. 4 and 6.

The cross sections of the sealing member 68 shown in FIGS. 5 and 6 illustrate in detail the interiors of the apertures 73, 74 and 75, 76. Each of these apertures is formed with a series of flutes 96, 97, and 98, 99 which define an axially spaced series of similar, flexible annular frustoconical rings 94, 103. These rings 94, 103 are formed along an inside surface of each primary cable aperture 73, 74 and an inside surface of each service cable aperture 75, 76. The flexible annular rings 94, 103 project upwardly and inwardly from the inside surfaces of the primary and service cable apertures 73, 74, 75, 76 at an angle of approximately 45°, and preferably terminate in rounded inner edges. With reference to FIG. 7, the annular rings 94 are shown in an upwardly compressed state between an external periphery 101 of the primary cable 26 and an inside surface of the primary cable aperture 74. The flexible annular form of the rings 94, 103 resiliently accommodate irregularities on the outside of the primary and service cables 26, 36 to assure a secure seal. These rings also accommodate primary and/or service cables over a range of diameters.

With reference to FIGS. 3 and 7, the sealed reenterable splice enclosure 20 is assembled by forming a looped portion 28 in the primary cable 26 and removing a portion of the cable jacket 30 therefrom to expose binder groups 32 contained within the primary cable 26. Entering and exiting portions 86, 88 of the primary cable 26 are inserted through primary cable apertures 73, 74 by separating the sealing member 68 at the radial slits 80, 81 to permit passage of a segment of each cable portion 86, 88 therethrough. Lengths of the spliced service cables 36 are inserted through the slits 85, 87 in the service cable apertures 75, 76. The ground cables 92 are inserted through the ground cable apertures 78 and appropriately attached to the primary cable 26.

Thus assembled, the sealing member 68 and the primary cable 26 and service cable 36 are positioned between the first and second portions 58, 60 of the lower split shell 42. The hinge portion 62 of the first portion 58 of the lower split shell 42 is engaged with the hinge pin 64 of the second portion 60. In a clam shell fashion, the first and second portions 58, 60 of the lower split shell 42 are closed around the outside surface 84 of the sealing member 68 to retain the sealing member 68 in the oval or circular receptacle 66 formed between the two portions 58, 60 of the lower split shell 42. Once fully closed, a fastener 100 is employed to attach apertured split shell engagement ears or brackets 102 cooperatively formed on opposing surfaces of the first and second portions 58, 60 of the lower split shell 42. The sealing member 68 is securely retained in the shell receptacle 66 in a generally uncompressed state.

Next, the upper seal neck member 40 is positioned with a bottom surface 104 thereof abutting a top surface 106 of the sealing member 68. Thus positioned, seal neck flange bores 108 formed through the seal neck flanges 70 are aligned with shell flange bores 110 formed through the shell flanges 72 for insertion of the threaded fasteners 46 therethrough. The threaded fasteners engage the threaded shell flange bores 110 to draw the lower split shell 42 and the upper seal neck 40 axially together thereby transferring axial or longitudinal compressive forces to the sealing member 68.

With reference to FIG. 7, the sealing member 68 is axially or longitudinally compressed between the bottom surface 104 of the seal neck member 40 and a bottom lip 112 formed in the bottom of the receptacle of the lower split shell member 42. Longitudinal compression of the sealing member 68 resiliently compresses the sealing member material thereby sealing its outer periphery 84 with shell receptacle 66 and also for sealing the radial slits 80, 81, 85, 87, the ground cable apertures 78, and the service and primary cable apertures 73, 74, 75, 76. The flexible annular rings 94, 103 formed in the primary cable and service cable apertures 73, 74, 75, 76 resiliently deform to form a seal between the outside periphery of the cables 26, 36 and the corresponding inside surfaces of the apertures 73, 74, 75, 76.

Lastly, the enclosure sealing O-ring 52 is positioned in the O-ring groove 54 formed towards the top end of the upper seal neck member 40. The dome member 22 is positioned over the upper seal neck member 40 and moved downwardly until a bottom edge 114 of the dome member 22 abuts a seal neck flange 116. Thus positioned, an annular groove 56 on the seal neck member 40 cooperatively aligns with a spline groove 118 formed on an inside surface 120 of the dome member 22. The flexible lock spline 44 is inserted through an access aperture 122 formed through the side of the dome member 22 to engage the cooperatively positioned annular and lock spline grooves 56, 118. The lock spline 44 acts to non-compressibly circumferentially engage and secure the dome member 22 with the seal neck member 40.

Figure 8:
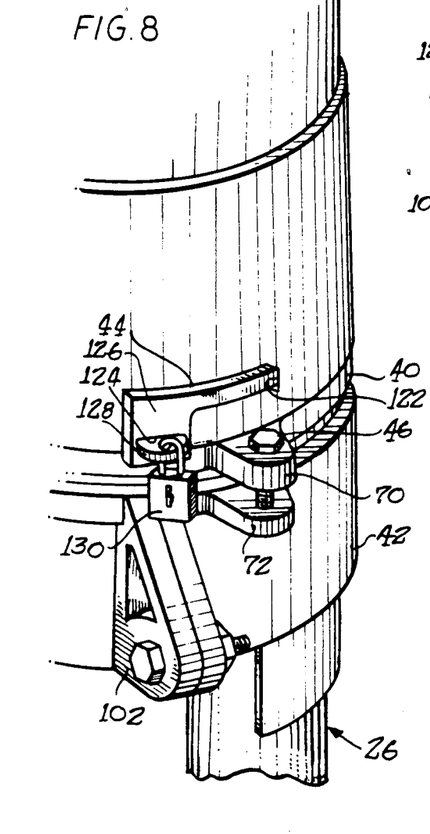
FIG. 8 is an enlarged partial perspective view showing the axial engagement between an upper seal neck portion and a lower shell portion and a spline which is employed to engage a dome member of the splice enclosure of FIGS. 1-3 with the upper seal neck portion.

With reference to FIG. 8, once the spline 44 has been fully inserted through the annular and spline grooves 56, 118 a slot 124 formed through a tab portion 126 formed on the end of the spline 44 defines a hasp-like structure which may be engaged with a staple or locking tab 128 formed on the outside of the dome member 22. Engagement of the slot 124 with the staple 128, and optionally the attachment of a lock or other security device 130 to the staple 128, prevents unintended release of the dome member 22 from the seal neck member 40.

In use, the sealed reenterable splice enclosure is assembled as described in detail hereinabove; reentry into the splice enclosure 20 is accomplished by disassembling the splice enclosure 20 through the inverse of the steps described above. However, if complete disassembly is not necessary extremely quick and efficient access to the splice connections 34 may be achieved by simply removing the dome member 22. Removal of the dome member requires only removing the security device 130 from the staple 128, releasing the tab portion 126 from the staple 128 and removing the lock spline 44 from the annular and spline grooves 56, 118. Upon removing the lock spline 44 the dome member 22 can be lifted free of the seal neck member 40 to expose the looped portion 28 of the primary cable 26 and the splice connections 34 made thereto. When the necessary operations are completed, the dome member 22 is replaced and attached as described above. When accessing the splice connections 34 or cables 26, 36 as described herein, the seal formed by the sealing member 68 need not be disturbed and need never be destroyed, as is common with prior art devices.

If a modification needs to be made to the splice enclosure 20, the enclosure 20 may be disassembled without destroying the sealing member 68 or requiring that a new sealing member 68 formed as is common with the prior art. For example, if a new service cable 36 needs to be installed, the splice enclosure is disassembled and the longitudinal compressive forces are removed by disengaging the seal neck member from the lower split shell member 42. Once the compressive forces are released, the seal neck member 40 is removed therefrom and the new service cable may be inserted through the sealing member 68, aperture 76 and spliced to the primary cable. The seal neck 40 is then attached to the shell 42 and reassembled with the rest of the splice enclosure 20 as described hereinabove.

It should also be clear from the drawings and the description provided hereinabove that the present invention may be employed to seal a tubular housing having two open ends. Such an open ended tube employs one sealing member 68 at each of the open ends to seal the contents therein. The sealing means 68 may be formed to provide the necessary number of apertures through which to project one or more members therethrough. Unused apertures may be sealed with a solid plug member of appropriate size to protect the contents of the sealed tube and/or dome-type enclosure from detrimental environmental effects.

While particular embodiments of the present invention have been shown and described in detail herein, it may be obvious to those skilled in the art that changes and modifications of the present invention in its various aspects, may be made without departing from the invention and its broader aspects, some of which changes and modifications being matters of routine engineering or design and others being apparent after study. As such, the scope of the invention should not be limited by the particular embodiments and specific constructions described herein, but should be defined by the appended claims and equivalents thereof. Accordingly, the aim of the appended claims is to cover all such changes and modifications as fall within the true spirit and scope of the invention.

The invention as claimed is as follows:

1. A reenterable splice enclosure for isolating a portion of a cable positioned therein and splice connections made thereto from detrimental environmental effects, said enclosure comprising: a housing for covering said splice connections, said housing having at least one opening for receiving said splice connections; and resealable sealing means for sealing said opening to protect said splice connections from detrimental environmental effects; said sealing means including a reusable sealing member and longitudinal compression means, said sealing member defining at least one through aperture therethrough for passage of at least one cable portion therethrough, and said longitudinal compression means releasably engaging and longitudinally compressing said sealing member, said sealing member being responsive to said engagement and longitudinal compression for sealing about its outer periphery and about said at least one cable portion projecting therethrough.

2. A splice enclosure according to claim 1, wherein said housing comprises a dome member having an elongate generally tubular sidewall portion terminating in a closed top at an end thereof distal said opening.

3. A splice enclosure according to claim 1, wherein said sealing member is a single piece body integrally formed of a resiliently compressible material.

4. A splice enclosure according to claim 3, wherein said sealing member is formed of a material characterized by, hydrolytic stability, resistance to dry heat aging, low compression set, and resistance to atmospheric and surface water-borne substances.

5. A splice enclosure according to claim 1, wherein said sealing member is compressed by said longitudinal compression means in a longitudinal direction relative to a longitudinal axis extending through said aperture formed in said sealing member, said longitudinal compression of said sealing member deforming said sealing member generally radially outwardly against an inside surface of said longitudinal compression means and generally radially inwardly against an outside surface of at least one entering member projecting through said apertures into said housing for sealing said opening and said entering member.

6. A reenterable splice enclosure for isolating a portion of a cable positioned therein and splice connections made thereto from detrimental environmental effects, said enclosure comprising: a housing for covering said splice connections, said housing having at least one opening for receiving said splice connections; and sealing means for sealing said opening to protect said splice connections from detrimental environmental effects; said sealing means including a sealing member and longitudinal compression means, wherein said sealing member is a single piece body integrally formed of a resiliently compressible material, and wherein said sealing member is formed of a material characterized by, tensile strength of at least substantially on the order of 75 psi, elongation of at least substantially on the order of 300% tear resistance of at least substantially on the order of 10 lbf/in, and compression set of less than substantially on the order of 8% after 8 days at 70° F. under 25% compression; an aperture formed in said sealing member defining at least one through aperture for passage of at least one cable portion therethrough, and said longitudinal compression means releasably engaging and longitudinally compressing said sealing member, said sealing member being responsive to said engagement and longitudinal compression for sealing about its outer periphery and about said at least one cable portion projecting therethrough.

7. A reenterable splice enclosure for isolating a portion of a cable positioned therein and splice connections made thereto from detrimental environmental effects, said enclosure comprising: a housing for covering said splice connections, said housing having at least one opening for receiving said splice connections; and sealing means for sealing said opening to protect said splice connections from detrimental environmental effects; said sealing means including a sealing member and longitudinal compression means, wherein said sealing member is a single piece body integrally formed of a resiliently compressible material; an aperture formed in said sealing member defining at least one through aperture for passage of at least one cable portion therethrough, and said longitudinal compression means releasably engaging and longitudinally compressing said sealing member, said sealing member being responsive to said engagement and longitudinal compression for sealing about its outer periphery and about said at least one cable portion projecting therethrough, and further including flexible annular rings formed on an inside surface of said aperture formed in said sealing member for sealing said sealing member against any of a plurality of cables over a predetermined range of sizes when said sealing member is axially compressed.

8. A reenterable splice closure for isolating a portion of a cable positioned therein and splice connections made thereto from detrimental environmental effects, said enclosure comprising: a housing for covering said splice connections, said housing having at least one opening for receiving said splice connections; and sealing means for sealing said opening to protect said splice connection from detrimental environmental effects; said sealing means including a sealing member and longitudinal compression means, an aperture formed in said sealing member defining at least one through aperture for passage of at least one cable portion therethrough, and said longitudinal compression means releasably engaging and longitudinally compressing said sealing member, said sealing member being responsive to said engagement and longitudinal compression for sealing about its outer periphery and about said at least one cable portion projecting therethrough wherein said longitudinal compression means includes an upper seal neck member and a lower shell portion configured for receiving said sealing member therebetween in an undeformed condition; said upper seal neck member being formed for releasably engaging said housing; and attachment means for removably attaching said housing to said upper seal neck member.

9. A splice enclosure according to claim 8, further including: mutually alignable annular grooves on corresponding surfaces of said upper seal neck member and said housing; an access aperture through said dome proximate to said annular grooves; a linearly rigid and circumferentially flexible spline member sized and dimensioned for insertion through said access aperture and into said annular grooves for removably attaching said housing to said upper seal neck member.

10. A splice enclosure according to claim 9, further including a sealing groove formed on an outside surface of the upper seal neck member non-coincident with said annular grooves formed on corresponding surfaces of said upper seal neck member and said housing; an enclosure sealing O-ring insertable into said sealing groove forming a seal between said upper seal neck member and an inside surface of said dome member.

11. A method of sealing a splice enclosure for isolating a portion of at least one cable positioned therein and splice connections made thereto from detrimental environmental effects, said method comprising the steps of: providing a housing with an opening for enclosing said splice connections; providing resealable sealing means including a reusable resiliently compressible sealing member formed with at least one aperture through which a cable may project and longitudinal compression means for retaining and longitudinally compressing said sealing member; positioning at least one cable in said housing and through said aperture formed in said sealing member; engaging said sealing member in said longitudinal compression means; attaching said housing to said longitudinal compression means; applying longitudinal compressive forces to said longitudinal compression means to thereby compress and deform said sealing member generally radially outwardly to seal against said opening and generally radially inwardly to seal said aperture against said at least one cable projecting therethrough.

12. A method according to claim 11, wherein said sealing member is formed of a material characterized by, hydrolytic stability, resistance to dry heat aging, low compression set, and resistance to pollution chemicals commonly found in surface water tables, and industrial/seacoast atmospheric environments.

13. A method of sealing a splice enclosure for isolating a portion of at least one cable positioned therein and splice connections made thereto from detrimental environmental effects, said method comprising the steps of: providing a housing with an opening for enclosing said splice connections; providing sealing means including a resiliently compressible sealing member formed with at least one aperture through which a cable projects and longitudinal compression means for retaining and longitudinally compressing said sealing member; positioning said at least one cable in said housing and through said aperture formed in said sealing member, said sealing member being formed of a material characterized by, tensile strength of at least substantially on the order of 75 psi, elongation of at least substantially on the order of 300%, tear resistance of at least substantially on the order of 10 lbf/in, and compression set of less than substantially on the order of 8% after 8 days at 70° F. under 25% compression; engaging said sealing member in said longitudinal compression means; attaching said housing to said longitudinal compression means; applying longitudinal compressive forces to said longitudinal compression means to thereby compress and deform said sealing member generally radially outwardly to seal against said opening and generally radially inwardly to seal said aperture against at least one cable projecting therethrough.

14. A sealable enclosure including means for sealing an opening in said enclosure to protect said enclosure against detrimental environmental effects and provide non-destructive reenterable access to said enclosure, at least one member when entered into said enclosure being protected thereby when sealed therein, said enclosure comprising: an enclosure member for protecting the contents thereof, an opening formed in said enclosure member for access thereto; said apparatus for sealing said opening formed in said enclosure including a sealing member and means for longitudinally compressing said sealing member; said sealing member being a single piece body integrally formed of a resiliently compressible material, at least one aperture formed through said sealing member for receiving said at least one member entering said enclosure; said means for longitudinally compressing said sealing member comprising a seal neck portion and a shell portion, said sealing member being positioned between said seal neck and said shell, said enclosure being removably engageable with said seal neck, said seal neck and shell being forcibly axially engaged in a longitudinal direction for exerting longitudinal compressive forces on said sealing member for radially inwardly sealing said at least one member when projecting through said aperture formed therein and radially outwardly sealing against said seal neck and said shell.

15. A sealing apparatus for a reenterable splice enclosure of the type having a dome member for covering said splice connections, said dome member having at least one opening for receiving said splice connections, for isolating a portion of a cable positioned therein and splice connections made thereto from detrimental environmental effects, said sealing apparatus comprising: a sealing member and longitudinal compression means, said sealing member defining at least one through aperture for passage of at least one cable portion therethrough, and said longitudinal compression means releasably engaging and longitudinally compressing said sealing member, said sealing member being responsive to said engagement and longitudinal compression for sealing about its outer periphery and about at least one cable portion projecting therethrough, wherein said sealing member is a single piece body integrally formed of a resiliently compressible material; and further including flexible annular rings formed on an inside surface of said aperture formed in said sealing member for sealing said sealing member against any of a plurality of cables over a predetermined range of sizes when said sealing member is axially compressed.

16. A sealing apparatus according to claim 15, wherein said sealing member is formed of a material characterized by, hydrolytic stability, resistance to dry heat aging, low compression set, and resistance to atmospheric and surface water-borne substances.

17. A sealing apparatus according to claim 15, wherein said sealing member is formed of a material characterized by, tensile strength of at least substantially on the order of 75 psi, elongation of at least substantially on the order of 300%, tear resistance of at least substantially on the order of 10 lbf/in, and compression set of less than substantially on the order of 8% after 8 days at 70° F. under 25% compression.

18. A reenterable splice enclosure for isolating a portion of a cable positioned therein and splice connections made thereto from detrimental environmental effects, said enclosure comprising: a housing for covering said splice connections, said housing having at least one opening for receiving said splice connections; and releasable sealing means for sealing said opening to protect said splice connections from detrimental environmental effects; said sealing means including a reusable sealing member and longitudinal compression means, said sealing member defining at least one through aperture therethrough for passage of at least one cable portion therethrough, and said longitudinal compression means releasably engaging and longitudinally compressing said sealing member, said sealing member being responsive to said engagement and longitudinal compression for sealing about its outer periphery and about said at least one cable portion projecting therethrough; and second resealable sealing means for sealably and releasably engaging said housing independently of the first releasable sealing means.

19. A reenterable splice enclosure according to claim 18 wherein said longitudinal compression means includes an upper seal neck member and a lower shell portion configured for receiving said sealing member therebetween in an undeformed condition; said second resealable sealing means being formed on said upper seal neck member for sealably engaging said housing.

20. A reenterable splice enclosure according to claim 19 further including attachment means for removably attaching said housing to said upper seal neck member.

* * * * *

UNITED STATES PATENT AND TRADEMARK OFFICE
CERTIFICATE OF CORRECTION

PATENT NO. : 5,055,636
DATED : October 8, 1991
INVENTOR(S) : Donald F. Jaycox It is certified that error appears in the above-identified patent and that said Letters Patent is hereby corrected as shown below:

Column 9, Line 26 "A reenterable splice closure" to

— A reenterable splice enclosure —

Column 9, Line 39 "said longitudinal compression means releasasbly" to

— said longitudinal compression means releasably —

Column 9, Line 49 "formed for releasably engaging said housing;" to

— formed for sealably engaging said housing; —

Column 9, Line 55 " an access aperture through said dome " to

— an access aperture through said housing —

Column 9, Line 68 "and an inside surface of said dome member" to

— and an inside surface of said housing —

Signed and Sealed this

Twenty-fourth Day of August, 1993

*Attest:*

BRUCE LEHMAN

*Attesting Officer*   *Commissioner of Patents and Trademarks*